United States Patent
Kono (10) Patent No.: US 10,564,509 B2
(45) Date of Patent: Feb. 18, 2020

(54) MACH-ZEHNDER MODULATOR, LIGHT MODULATING APPARATUS

(71) Applicant: SUMITOMO ELECTRIC INDUSTRIES, LTD., Osaka (JP)

(72) Inventor: Naoya Kono, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 16/122,355

(22) Filed: Sep. 5, 2018

(65) Prior Publication Data

US 2019/0072834 A1    Mar. 7, 2019

(30) Foreign Application Priority Data

Sep. 6, 2017    (JP) ................................. 2017-171311

(51) Int. Cl.
G02F 1/225    (2006.01)
G02F 1/21    (2006.01)

(52) U.S. Cl.
CPC ...... *G02F 1/2257* (2013.01); *G02F 2001/212* (2013.01)

(58) Field of Classification Search
CPC ........................ G02F 1/2257; G02F 2001/212
See application file for complete search history.

(56) References Cited

U.S. PATENT DOCUMENTS

| 8,280,201 | B2 * | 10/2012 | Prosyk | G02F 1/225 |
| | | | | 359/237 |
| 8,380,017 | B2 * | 2/2013 | Sugiyama | G02B 6/29352 |
| | | | | 385/2 |
| 8,903,202 | B1 * | 12/2014 | Prosyk | G02F 1/225 |
| | | | | 385/2 |
| 9,081,253 | B2 * | 7/2015 | Kono | G02F 1/225 |
| 9,274,399 | B2 * | 3/2016 | Yamaji | G02F 1/0123 |
| 9,280,004 | B2 * | 3/2016 | Yagi | G02F 1/025 |
| 2013/0136388 | A1 * | 5/2013 | Uesaka | G02F 1/0123 |
| | | | | 385/3 |
| 2013/0209023 | A1 | 8/2013 | Prosyk | |

(Continued)

*Primary Examiner* — Ryan A Lepisto
(74) *Attorney, Agent, or Firm* — Smith, Gambrell & Russell, LLP (57) ABSTRACT

A Mach-Zehnder modulator includes: a first semiconductor arm including a lower semiconductor region, an upper semiconductor layer, and a core layer disposed between the lower semiconductor region and the upper semiconductor layer; a second semiconductor arm including a lower semiconductor region, an upper semiconductor layer, and a core layer disposed between the lower semiconductor region and the upper semiconductor layer; a conductive semiconductor region connecting the lower semiconductor regions of the first and second semiconductor arms with each other; and a differential transmission line including a first signal transmitting conductor, a second signal transmitting conductor, and a reference potential conductor. The first and second signal transmitting conductors are coupled to the first and second semiconductor arms, respectively. The reference potential conductor extends on the conductive semiconductor region between the first and second signal transmitting conductor and the second signal transmitting conductor, and is isolated from the conductive semiconductor region.

7 Claims, 10 Drawing Sheets

(56) References Cited

U.S. PATENT DOCUMENTS

| | | | | |
|---|---|---|---|---|
| 2014/0153860 A1* | 6/2014 | Prosyk | ................ | G02F 1/2257 |
| | | | | 385/3 |
| 2014/0241659 A1* | 8/2014 | Fukuda | ................ | G02F 1/0121 |
| | | | | 385/3 |
| 2016/0054639 A1* | 2/2016 | Kono | ................ | G02F 1/2255 |
| | | | | 385/2 |

* cited by examiner

Fig.10

MACH-ZEHNDER MODULATOR, LIGHT MODULATING APPARATUS

BACKGROUND OF THE INVENTION

Field of the Invention

The present invention relates to a Mach-Zehnder modulator and a light modulating apparatus. This application claims the benefit of priority from Japanese Patent Application No. 2017-171311 filed on Sep. 6, 2017, which is herein incorporated by reference in its entirety.

Related Background Art

US Patent Publication No. 2013/0209023, referred to as Patent Document 1, discloses a differential drive Mach-Zehnder modulator.

SUMMARY OF THE INVENTION

A Mach-Zehnder modulator according to one aspect of the present invention includes: a first semiconductor arm including a lower semiconductor region, an upper semiconductor layer, and a core layer disposed between the lower semiconductor region and the upper semiconductor layer; a second semiconductor arm including a lower semiconductor region, an upper semiconductor layer, and a core layer disposed between the lower semiconductor region and the upper semiconductor layer; a conductive semiconductor region connecting the lower semiconductor region of the first semiconductor arm and the lower semiconductor region of the second semiconductor arm with each other; and a differential transmission line including a first signal transmitting conductor, a second signal transmitting conductor, and a reference potential conductor, the first signal transmitting conductor and the second signal transmitting conductor being coupled to the first semiconductor arm and the second semiconductor arm, respectively, the reference potential conductor extending on the conductive semiconductor region between the first signal transmitting conductor and the second signal transmitting conductor, and the reference potential conductor being isolated from the conductive semiconductor region.

A light modulating apparatus includes a Mach-Zehnder modulator and a differential signal source. The Mach-Zehnder modulator includes: a first semiconductor arm including a lower semiconductor region, an upper semiconductor layer, and a core layer disposed between the lower semiconductor region and the upper semiconductor layer; a second semiconductor arm including a lower semiconductor region, an upper semiconductor layer, and a core layer disposed between the lower semiconductor region and the upper semiconductor layer; a conductive semiconductor region connecting the lower semiconductor region of the first semiconductor arm and the lower semiconductor region of the second semiconductor arm with each other; and a differential transmission line including a first signal transmitting conductor, a second signal transmitting conductor, and a reference potential conductor, the first signal transmitting conductor and the second signal transmitting conductor being coupled to the first semiconductor arm and the second semiconductor arm, respectively, the reference potential conductor extending on the conductive semiconductor region between the first signal transmitting conductor and the second signal transmitting conductor, and the reference potential conductor being isolated from the conductive semiconductor region; and the differential signal source driving the first semiconductor arm and the second semiconductor arm through the differential transmission line.

BRIEF DESCRIPTION OF THE DRAWINGS

The above-described objects and the other objects, features, and advantages of the present invention become more apparent from the following detailed description of the preferred embodiments of the present invention proceeding with reference to the attached drawings.

DESCRIPTION OF THE PREFERRED EMBODIMENTS

The Mach-Zehnder modulator in Patent Document 1 uses a transmission line which includes both a pair of signal conductors for driving a pair of arm waveguides, and a pair of ground conductors extending outside along the signal conductors. This Mach-Zehnder modulator exhibits periodic dips in its response characteristics in high frequencies.

The inventor's findings reveal that the dips in the high frequencies makes the modulation response unsatisfactory.

It is an object of one aspect of the present invention to provide a Mach-Zehnder modulator having a differential transmission line allowing a stable ground potential. It is an object of another aspect of the present invention to provide a light modulating apparatus including the Mach-Zehnder modulator.

A description will be given of embodiments.

A Mach-Zehnder modulator according to an embodiment includes: (a) a first semiconductor arm including a lower semiconductor region, an upper semiconductor layer, and a core layer disposed between the lower semiconductor region and the upper semiconductor layer; (b) a second semiconductor arm including a lower semiconductor region, an upper semiconductor layer, and a core layer disposed between the lower semiconductor region and the upper semiconductor layer; (c) a conductive semiconductor region connecting the lower semiconductor region of the first semiconductor arm and the lower semiconductor region of the second semiconductor arm with each other; and (d) a differential transmission line including a first signal transmitting conductor, a second signal transmitting conductor, and a reference potential conductor, the first signal transmitting conductor and the second signal transmitting conductor being coupled to the first semiconductor arm and the second semiconductor arm, respectively, the reference potential conductor extending on the conductive semiconductor region between the first signal transmitting conductor and the second signal transmitting conductor, and the reference potential conductor being isolated from the conductive semiconductor region.

The Mach-Zehnder modulator provides the differential transmission line, which can drive the semiconductor arms, with the first and second signal transmitting conductors and the reference potential conductor extending therebetween. The application of a differential signal to the first and second signal transmitting conductors produces respective electric fields outside the first and second signal transmitting conductors. These outer electric-field vectors from the first and second signal transmitting conductors are combined to form composite vectors of the electric field vectors, which have very small absolute values close to zero or equal to zero on an area between the signal transmitting conductors, i.e., the virtual ground. The differential transmitting line can provide the virtual ground on the reference potential conductor thereof, so that the reference potential conductor between the first and second signal transmitting conductors can consequently make the ground plane stable. In addition, the conductive semiconductor region, insulated from the reference potential conductor in the Mach-Zehnder modulator, enables a driving system different from that for a conductive semiconductor region which is traditionally grounded.

In the Mach-Zehnder modulator according to an embodiment, the first signal transmitting conductor is disposed on the first semiconductor arm and is connected to the first semiconductor arm, and the second signal transmitting conductor is disposed on the second semiconductor arm and is connected to the second semiconductor arm.

The Mach-Zehnder modulator allows the first and second signal transmitting conductors to extend on and be connected to the first and second semiconductor arms, respectively, thereby providing the first and second semiconductor arms with a differential conduction line.

The Mach-Zehnder modulator allows the electrode to apply, to the conductive semiconductor region, an external bias for adjusting the potential of the conductive semiconductor region. Power feeding to the electrodes is independent of potential on the differential transmission line.

The Mach-Zehnder modulator according to an embodiment further includes an electrode connected to the conductive semiconductor region.

In the Mach-Zehnder modulator according to an embodiment, the first signal transmitting conductor includes a first conductor and multiple first electrodes, and the first conductor is connected to the first semiconductor arm through the multiple first electrodes. The second signal transmitting conductor includes a second conductor and multiple second electrodes, and the second conductor is connected to the second semiconductor arm through the multiple second electrodes. The multiple first electrodes are arranged to be spaced apart from one another on the first semiconductor arm, and the multiple second electrodes are arranged to be spaced apart from one another on the second semiconductor arm.

The Mach-Zehnder modulator allows the first and second conductors, which extend along the first and second semiconductor arms respectively, to form a traveling-wave electrode structure.

In the Mach-Zehnder modulator according to an embodiment, the first semiconductor arm includes first portions each of which has a contact layer, and second portions each of which has no contact layer, and the second semiconductor arm includes first portions each of which has a contact layer, and second portions each of which has no contact layer.

The Mach-Zehnder modulator provides the upper semiconductor layer of each of the first and second semiconductor arms with the first portion including the contact layer and the second portion excluding the contact layer, and the second portion has higher specific resistance than that of the first portion. This upper semiconductor layer structure facilitates the separation of signal phase between the adjacent first and second electrodes of the traveling-wave electrode structure.

A light modulating apparatus according to an embodiment includes (a) a Mach-Zehnder modulator, and (b) a differential signal source. The Mach-Zehnder modulator includes: a first semiconductor arm having a lower semiconductor region, an upper semiconductor layer, and a core layer disposed between the lower semiconductor region and the upper semiconductor layer; a second semiconductor arm having a lower semiconductor region, an upper semiconductor layer, and a core layer disposed between the lower semiconductor region and the upper semiconductor layer; a conductive semiconductor region connecting the lower semiconductor region of the first semiconductor arm and the lower semiconductor region of the second semiconductor arm with each other; and a differential transmission line including a first signal transmitting conductor, a second signal transmitting conductor, and a reference potential conductor, the first signal transmitting conductor and the second signal transmitting conductor being coupled to the first semiconductor arm and the second semiconductor arm, respectively, the reference potential conductor extending on the conductive semiconductor region between the first signal transmitting conductor and the second signal transmitting conductor, and the reference potential conductor being isolated from the conductive semiconductor region. The differential signal source drives the first semiconductor arm and the second semiconductor arm through the differential transmission line.

The light modulating apparatus provides the Mach-Zehnder modulator with no ground plane outside the first and second signal transmitting conductors of the differential transmission line. Accordingly, the differential transmission line includes no physical ground plane outside the first and second signal transmitting conductors that may make the potential thereon instable. No outer ground plane prevents potential instability on the differential transmission line from making the high-frequency characteristics of the Mach-Zehnder modulator deteriorated.

The light modulating apparatus according to an embodiment further includes a direct current voltage source, the direct current voltage source supplying the conductive semiconductor region to a bias voltage.

The light modulating apparatus allows the DC voltage source to apply a desired potential to the conductive semiconductor region, which is insulated from the reference potential conductor.

Teachings of the present invention can be readily understood by considering the following detailed description with reference to the accompanying drawings shown as examples. Referring to the accompanying drawings, embodiments of Mach-Zehnder modulator and a light modulating apparatus according to the present invention will be described below. To facilitate understanding, identical reference numerals are used, where possible, to designate identical elements that are common to the figures.

Figure 1:
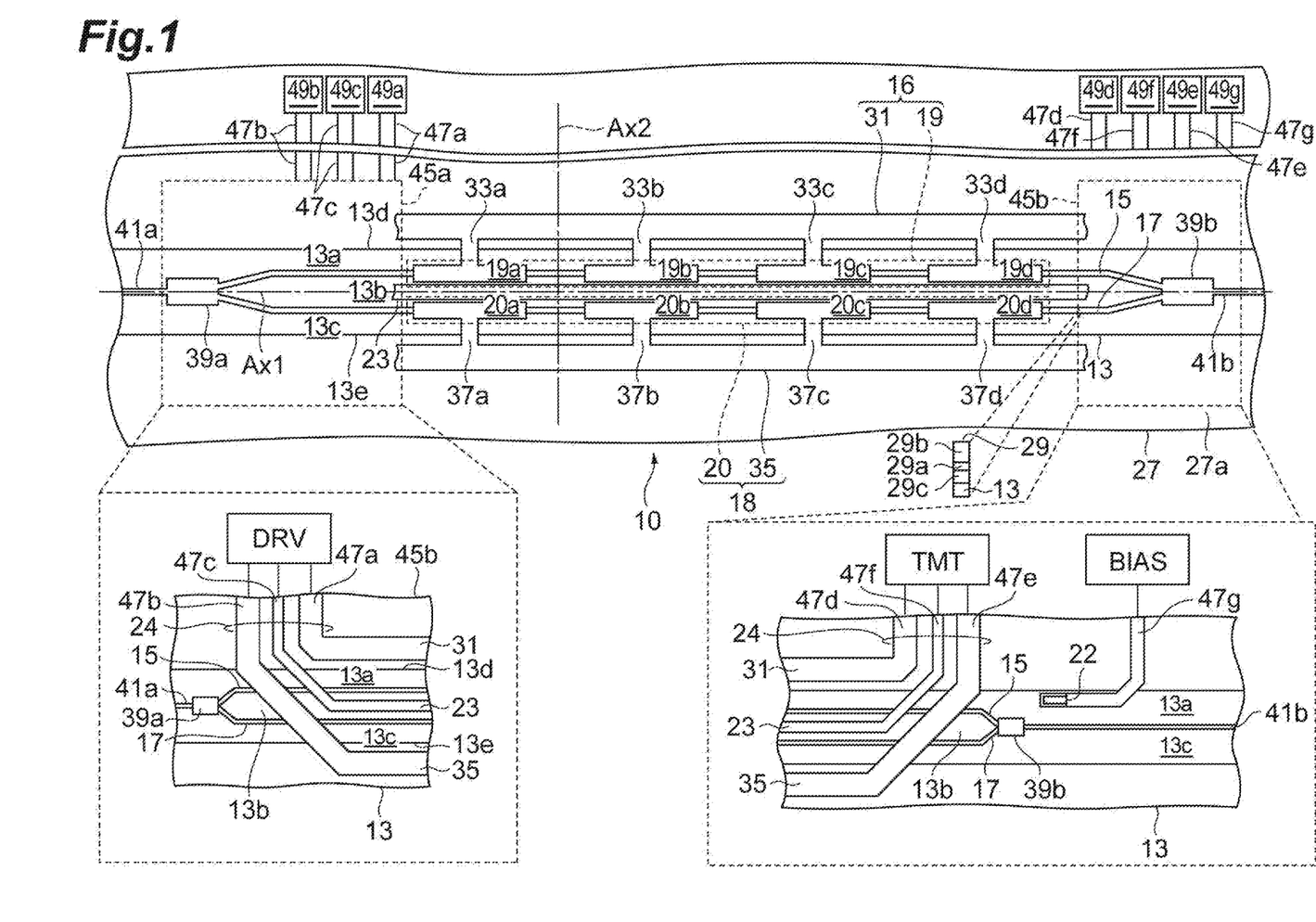
FIG. 1 is a schematic plan view showing a Mach-Zehnder modulator according to the embodiment.

FIG. 1 is a schematic plan view showing a Mach-Zehnder modulator according to the embodiment. The Mach-Zehnder modulator 10 includes a first semiconductor arm 15, a second semiconductor arm 17, and a differential transmission line 24. Each of the first and second semiconductor arms 15 and 17 includes a core layer 29a, an upper semiconductor layer 29b, and a lower semiconductor region 29c, and the core layer 29a is disposed between the upper semiconductor layer 29b, and the lower semiconductor region 29c and the conductive semiconductor region 13. Each of the first and second semiconductor arms 15 and 17 includes a semiconductor mesa 29, which is provided with the lower semiconductor region 29c, the core layer 29a, and the upper semiconductor layer 29b. If necessary, the semiconductor mesa 29 may further include a contact layer 29d in the uppermost layer thereof. The upper and lower semiconductor layers 29b and 29c each serve as a cladding. The lower semiconductor region 29c includes a semiconductor of a first conductivity type, and the upper semiconductor layer 29b includes a semiconductor of a second conductivity type opposite to the first conductivity type. The conductive semiconductor region 13 connects the lower semiconductor regions 29c of the first and second semiconductor arms 15 and 17 to each other. In the present embodiment, the first and second semiconductor arms 15 and 17 are provided on the common conductive semiconductor region 13. If necessary, the conductive semiconductor region 13 may include the lower semiconductor regions 29c in the first and second semiconductor arms 15 and 17 as parts thereof. The conductive semiconductor region 13 mounts the first and second semiconductor arms 15 and 17, most of which extend straight in the direction of the first axis Ax1, so that the first and second semiconductor arms 15 and 17 are provided with the respective straight sections fed by first and second signal transmitting conductors 16 and 18. The first and second signal transmitting conductors 16 and 18 are provided with respective straight portions extending in the direction of the first axis Ax1 in order to feed the respective straight sections of the first and second semiconductor arms 15 and 17.

The differential transmission line 24 is constituted by the single reference potential conductor 23 as well as the first and second signal transmitting conductors 16 and 18. The first and second signal transmitting conductors 16 and 18 are electrically coupled to the respective upper semiconductor layers 29b of the first and second semiconductor arm 15 and 17. The reference potential conductor 23 is disposed between the first and second signal transmitting conductors 16 and 18 to extend longitudinally over the conductive semiconductor region 13, and is insulated from the conductive semiconductor region 13.

The Mach-Zehnder modulator 10 is provided with the differential transmission line 24, which includes the reference potential conductor 23 and the first and second signal transmitting conductors 16 and 18 for driving the semiconductor arms (15 and 17). In the differential transmission line 24, the single reference potential conductor 23 extends along the first and second signal transmitting conductors 16 and 18 on the conductive semiconductor region 13. The application of a differential signal to the conductors (16 and 18) in the differential transmission line 24 produces respective electric fields outside the signal transmitting conductors (19 and 20). These electric field vectors in these electric fields are added to form a resultant vector, which takes zero or substantially zero in a certain area between the signal transmitting conductors (16 and 18), i.e., the virtual ground. The differential transmission line 24 allows the virtual ground to be on the reference potential conductor 23 thereof. The reference potential conductor 23 between the first and second signal transmitting conductors 16 and 18 can be combined with the virtual ground to create a stable ground plane. In addition, insulating the conductive semiconductor region 13 from the reference potential conductor 23 enables a driving system different from that for another Mach-Zehnder modulator which grounds the conductive semiconductor region 13 thereof.

The Mach-Zehnder modulator 10 may further include an electrode 22 connected to the conductive semiconductor region 13. The electrode 22 includes a conductor that is independent of the differential transmission line 24. The Mach-Zehnder modulator 10 allows the electrode 22 to apply an external bias to the conductive semiconductor region 13, thereby adjusting the potential of the conductive semiconductor region 13. In the present embodiment, the electrode 22 is connected to an external voltage source BIAS.

The differential transmission line 24 is connected to a driver (for example, the drive circuit DRV) to receive the differential drive signal from at one end thereof. The differential drive signal is applied to the first and second semiconductor arms 15 and 17 through the differential transmission line 24 on the Mach-Zehnder modulator 10. The differential transmission line 24 is connected to a terminator TMT, which is terminated at the other end thereof.

In the Mach-Zehnder modulator 10 according to the present embodiment, the first signal transmitting conductor 16 includes one or more first electrodes 19 which make contact with the first semiconductor arm 15, and a first conducting body 31 which extends along the first semiconductor arm 15. The second signal transmitting conductor 18 may include one or more second electrodes 20 which make contact with the second semiconductor arm 17, and a second conducting body 35 which extends along the second semiconductor arm 17.

In the differential transmission line 24, the first electrode 19 receives one driving signal, which is to be applied to the first semiconductor arm 15, from the first conducting body 31, and supplies the drive signal to the semiconductor mesa 29 in the first semiconductor arm 15. The second electrode 20 receives the other driving signal, which is to be applied to the second semiconductor arm 17, from the second conducting body 35 and supplies the driving signal to the semiconductor mesa 29 in the second semiconductor arm 17. The Mach-Zehnder modulator 10 uses the first and second electrodes 19 and 20 to allow the first and second semiconductor arms 15 and 17 to receive driving signal components for differential driving system, respectively.

The first electrode 19 has multiple sections spaced apart from one another on the first semiconductor arm 15, and the second electrode 20 has multiple sections spaced apart from one another on the second semiconductor arm 17. In the Mach-Zehnder modulator 10, the first and second electrodes 19 and 20, which are arranged along the first and second semiconductor arms 15 and 17, respectively, can form a traveling wave electrode structure. Specifically, as shown in FIG. 1, the first electrode 19 includes multiple first electrode sections 19a, 19b, 19c, and 19d arranged in the direction of the first axis Ax1, and the first electrode sections 19a to 19d are connected to the top face of the first semiconductor arm 15. The second electrode 20 includes multiple second electrode sections 20a, 20b, 20c, and 20d arranged in the direction of the first axis Ax1, and the second electrode sections 20a to 20d are connected on the top face of the second semiconductor arm 17.

Specifically, the first signal transmitting conductor 16 includes a first conducting body 31 and multiple metal bridges (for example, first metal bridges 33a, 33b, 33c, and 33d) along with the first electrode 19. The first metal bridges 33a to 33d connect the first electrode sections 19a to 19d to the first conducting body 31, respectively. Further, the second signal transmitting conductor 18 includes the second conducting body 35 and multiple metal bridges (for example, the second metal bridges 37a, 37b, 37c, and 37d) along with the second electrode 20. The second metal bridges 37a to 37d connect the second electrode sections 20a to 20d to the second conducting body 35, respectively. The first conducting body 31, the first semiconductor arm 15, the reference potential conductor 23, the second semiconductor arm 17, and the second conducting body 35 are arranged in a direction of a second axis Ax2 intersecting that of the first axis Ax1.

The Mach-Zehnder modulator 10 is provided with the first electrode sections 19a to 19d separately from the first conducting body 31 and the second electrode sections 20a to 20d separately from the second conducting body 35. Accordingly, the first and second conducting bodies 31 and 35 can be outward apart from the first and second semiconductor arms 15 and 17. In the present embodiment, the first electrode sections 19a to 19d are arranged at a predetermined interval to make contact with the first semiconductor arm 15 through respective contact openings each of which has a predetermined length. The second electrode sections 20a to 20d are arranged at a predetermined interval to make contact with the second semiconductor arm 17 through respective contact openings, which of which has a predetermined length.

The Mach-Zehnder modulator 10 includes a first branching waveguide 39a and a second branching waveguide 39b, which serve as a merger or divider. The first branching waveguide 39a is connected with one ends of the first and second semiconductor arms 15 and 17, and the second branching waveguide 39b is connected with the other ends of the first and second semiconductor arms 15 and 17. The first and second branching waveguides 39a and 39b can be, for example, a multimode interference device (for example, MMI device). The Mach-Zehnder modulator 10 has a first waveguide 41a and a second waveguide 41b serving as an optical input or output waveguide. The first waveguide 41a is optically coupled to the first and second semiconductor arms 15 and 17 through the first branching waveguide 39a. The second waveguide 41b is optically coupled to the first and second semiconductor arms 15 and 17 through the first branching waveguide 39b.

Referring to FIG. 1, exemplary arrangements of the first and second signal transmitting conductors 16 and 18 are depicted in square areas denoted by reference numerals 45a and 45b. These arrangements include interconnects from the pad electrodes to the respective conducting bodies running parallel to the first and second semiconductor arms 15 and 17.

The Mach-Zehnder modulator 10 includes a first interconnect 47a, a second interconnect 47b, a third interconnect 47c, a first pad electrode 49a, a second pad electrode 49b, and a third pad electrode 49c. The first pad electrode 49a is connected to one end of the first conducting body 31 (the first electrode 19) via the first interconnect 47a. The second pad electrode 49b is connected to one end of the second conducting body 35 (the second electrode 20) via the second interconnect 47b. The third pad electrode 49c is connected to the reference potential conductor 23 via the third interconnect 47c. The first and second interconnects 47a and 47b extend in parallel with the third interconnect 47c and away from the third interconnect 47c, and the third interconnect 47c is disposed between the first and second interconnects 47a and 47b.

The Mach-Zehnder modulator 10 allows the first and second interconnects 47a and 47b to transmit the differential drive signal from the first and second pad electrodes 49a and 49b to the first and second electrodes 19 and 20, respectively. The first to third interconnects 47a to 47c constitute a transmission line of a SGS structure, which can transmit a high-frequency differential signal with low loss. The third interconnect 47c, which is located between the first and second interconnects 47a and 47b, is also formed on the virtual ground plane that is formed by the electric fields of the differential signal propagating on the first and second interconnects 47a and 47b. This agreement between the reference level interconnect 47c and the virtual ground plane can stabilize the ground potential in the differential transmission line 24, and the differential transmission line 24 exhibits excellent high-frequency signal transmission characteristics. As described above, the differential transmission line 24 locates the third interconnect 47c in the inner area between the first and second interconnects 47a and 47b and excludes a reference level interconnect outside the inner area at the same level in height as that of the first and second interconnects 47a and 47b. A single central conducting layer, such as the third interconnect 47c, in the differential transmission line 24 accepts the single virtual ground plane that is formed by the electric field of the differential signal propagating on the first and second interconnects 47a and 47b.

The Mach-Zehnder modulator 10 categorizes the conductive semiconductor region 13, which is sectioned by the first and second semiconductor arms 15 and 17, into three portions, for example, a first semiconductor portion 13a, a second semiconductor portion 13b, and a third semiconductor portion 13c. The second semiconductor portion 13b is located between the first and second semiconductor portions 13a and 13c. The first, second and third semiconductor portions 13a, 13b, and 13c extend in the direction of the first axis Ax1. The first semiconductor portion 13a is defined as an area between the bottom edge of the first semiconductor arm 15 and the edge line 13d of the conductive semiconductor region 13. The third semiconductor portion 13c is defined as an area between the bottom edge of the second semiconductor arm 17 and the edge line 13e of the conductive semiconductor region 13. The second semiconductor portion 13b is defined as an area between the bottom edge of the first semiconductor arm 15 and the bottom edge of the second semiconductor arm 17. The first and second semiconductor arms 15 and 17 join together to terminate the second semiconductor portion 13b.

The Mach-Zehnder modulator 10 includes a fourth interconnect 47d, a fifth interconnect 47e, and a sixth interconnect 47f, a fourth pad electrode 49d, a fifth pad electrode 49e, and a sixth pad electrode 49f. The fourth pad electrode 49d is connected to the other end of the first conducting body 31 (the first electrode 19) via the fourth interconnect 47d. The fifth pad electrode 49e is connected to the other end of the second conducting body 35 (the second electrode 20) via the fifth interconnect 47e. The sixth pad electrode 49f is connected to the reference potential conductor 23 via the sixth interconnect 47f. The fourth interconnect 47d extends in parallel with and apart from the sixth interconnect 47f. The fifth interconnect 47e extends in parallel with and apart from the sixth interconnect 47f. The sixth interconnect 47f is disposed between the fourth and fifth interconnects 47d and 47e.

The Mach-Zehnder modulator 10 includes the seventh interconnect 47g separately from the differential transmitting line 24, and the seventh interconnect 47g is connected to the electrode 22. The electrode 22 is connected to the first semiconductor portion 13a or the third semiconductor portion 13c of the conductive semiconductor region 13.

In the embodiment, the first, second and third pad electrodes 49a, 49b, and 49c receive a differential signal from the driving circuit DRV. In addition, the fourth, fifth and sixth pad electrodes 49d, 49e, and 49f can be connected to the terminating resistance device (TMT). The fifth pad electrode 49g can be connected to a bias voltage source (BIAS).

If necessary, the Mach-Zehnder modulator 10 may further include a terminating resistor on a supporting base 27 without using the fourth and fifth pad electrodes 49d and 49e. This terminating resistor is connected between the fourth and fifth interconnects 47d and 47e.

Figure 2A:
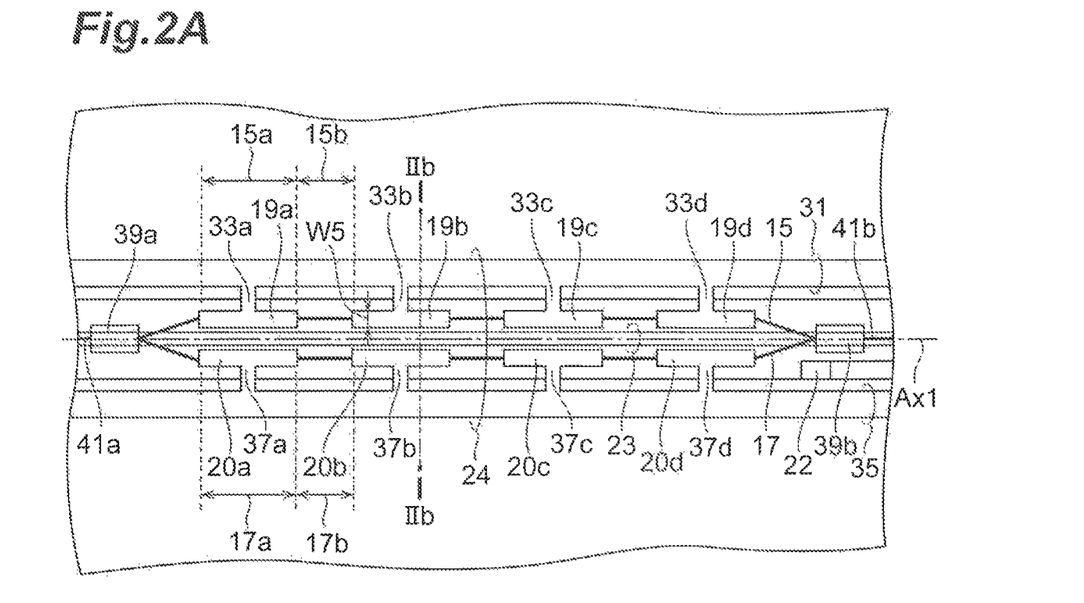
FIG. 2A is a schematic plan view showing a part of the Mach-Zehnder modulator shown in FIG. 1.
Figure 2B:
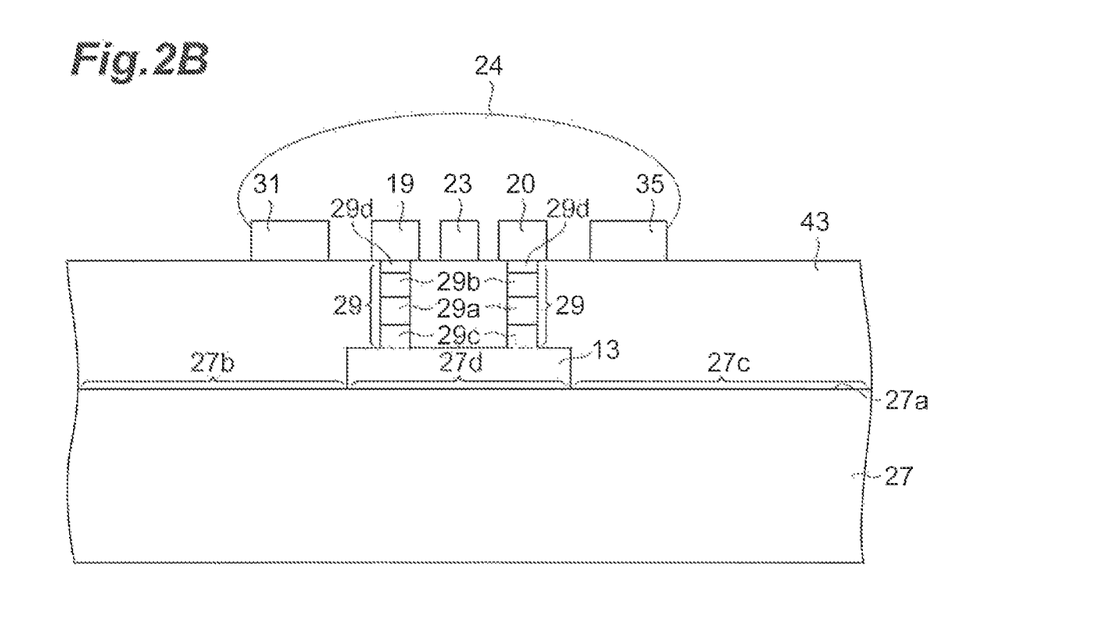
FIG. 2B is a cross sectional view taken along IIb-IIb line shown in FIG. 2A.

FIGS. 2A and 2B are schematic views showing the structure of the Mach-Zehnder modulator shown in FIG. 1. Specifically, FIG. 2A is a plan view showing the structure according to an embodiment for the Mach-Zehnder modulator shown in FIG. 1. FIG. 2B shows a cross sectional view taken along line IIb-IIb shown in FIG. 2A.

Referring to FIG. 2B, the supporting base 27 has a principal face 27a with a first area 27b, a second area 27c, and a third area 27d. The third area 27d is between the first and second areas 27b and 27c. The third area 27d extends in the direction of the first axis Ax1. The conductive semiconductor region 13 extends along the principal face 27a of the supporting base 27 in the direction of the first axis Ax1. The conductive semiconductor region 13 has a strip shape and is disposed on the third area 27d apart from the first and second areas 27b and 27c. The first conducting body 31 extends on the first area 27b, and the second conducting body 35 extends on the second area 27c. The Mach-Zehnder modulator 10 includes an embedding region 43, which embeds the first and second semiconductor arms 15 and 17, the first and second branching waveguides 39a and 39b, and the first and second waveguides 41a and 41b. The reference potential conductor 23 is spaced apart from the conductive semiconductor region 13 by the embedding region 43.

The first semiconductor arm 15 includes multiple portions 15a and multiple second portions 15b, and the first and second portions 15a and 15b are alternately arranged in the direction of the first axis Ax1. In the first semiconductor arm 15, the each of first portions 15a may include the contact layer 29d in the semiconductor mesa 29, and each of the second portions 15b does not include the contact layer 29d. The first electrode sections 19a to 19d of the first electrode 19 makes contact with the respective first portions 15a and are not electrically connected to the second portions 15b.

The second semiconductor arm 17 includes multiple first portions 17a and multiple second portions 17b, and the first and second portions 17a and 17b are alternately arranged in the direction of the first axis Ax1. In the second semiconductor arm 17, each of the first portions 17a includes the contact layer 29d of the semiconductor mesa 29, and each of the second portions 17b does not include the contact layer 29d. The second electrode sections 20a to 20d of the second electrode 20 make contact with the respective first portions 17a and are not electrically connected to the second portion 17b of the second semiconductor arm 17.

The Mach-Zehnder modulator has an isolation structure, which allows the second portions (15b and 17b) without the contact layer 29d to have a specific resistance higher than that of the first portions (15a and 17a), each of which includes the contact layer 29d, in the upper semiconductor regions (29b and 29d) of the first and second semiconductor arms 15 and 17. The upper semiconductor regions (29b and 29d) are provided with the isolation structure that facilitates separation of signal phases between adjacent electrode sections among the first electrode sections 19a to 19d and adjacent electrode sections among the second electrode sections 20a to 20d in the traveling wave structure. This electrical separation may have a resistance of, for example, 1 megohm or more. If needed, in addition to the removal of the contact layer 29d in the second portions (15b and 17b), the cladding region of the upper semiconductor layer of each of the second portions (15b and 17b) can have a concentration of hydrogen and/or helium higher than that of the cladding region of the lower semiconductor region. Ion implantation can provide the second portions (15b and 17b) with high concentrations of hydrogen and/or helium. The ion implantation can use ionic species including hydrogen and/or helium. If needed, the cladding region of the upper semiconductor layer can be further removed from the second portions (15b and 17b) that do not includes the contact layer 29d, thereby forming a recess in the upper semiconductor layer, and if possible, the recess is filled with i-type semiconductor or a semiconductor of the opposite conductivity type.

The Mach-Zehnder modulator 10 allows the first and second conducting bodies 31 and 35 to extend over the first and second areas 27b and 27c, and allows the third area 27d to mount the conductive semiconductor region 13 of a strip shape extending in the direction of the first axis Ax1. The arrangement of the first and second conducting bodies 31 and 35 and the conductive semiconductor region 13 can reduce the electrical coupling between the conductive semiconductor region 13 and the first and second conducting bodies 31 and 35.

The Mach-Zehnder modulator 10 is fabricated using semiconductor processes, such as epitaxial growth, photolithography, etching, vapor deposition and metallization.

Figure 3:
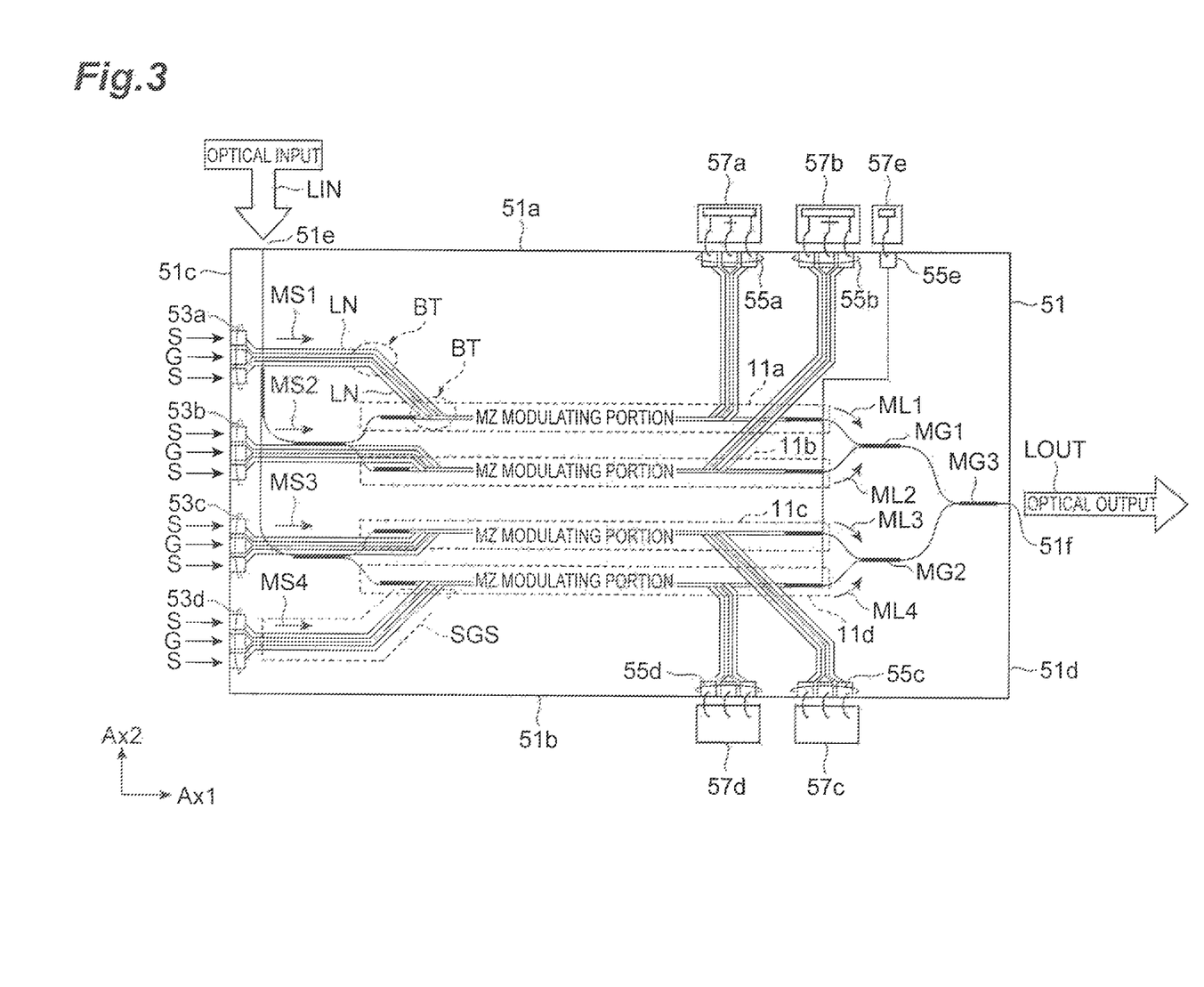
FIG. 3 is a schematic view showing an optical integrated semiconductor device including multiple Mach-Zehnder modulators according to the embodiment.

FIG. 3 is a schematic view showing an optical integrated device including a Mach-Zehnder modulator according to the embodiment. The optical integrated device 51 according to the embodiment includes four Mach-Zehnder modulators 11a to 11d. The Mach-Zehnder modulators 11a to 11d each may have substantially the same structure as the Mach-Zehnder modulator 10.

Referring to FIG. 3, the integrated optical device 51 of semiconductor includes a first edge 51a and a second edge 51b which extend in the direction of the first axis Ax1, and a third edge 51c and a fourth edge 51d which extend in the direction of the second axis Ax2. In the present embodiment, the first edge 51a is provided with an input port 51e, which can receive continuous light to be modulated, and the fourth edge 51d is provided with an output port 51f, which can provide the modulated light. The input light LIN from the input port 51e is supplied to each of the Mach-Zehnder modulators 11a to 11d via the splitter. The optical integrated device 51 receives the electrical signals MS1 to MS4 for optical modulation at the pads 53a to 53d, which are arranged along the third edge 51c. The electrical signals MS1 to MS4 are applied to the pads 53a to 53d, respectively, each of which receives the ground potential, the signal of voltage amplitudes and the ground potential to reach the respective electrodes at the ends of the Mach-Zehnder modulators 11a to 11d through a group SGS of the metal interconnects, referred to as a SGS structure. In this embodiment, the SGS structure includes one or more straight portions LN and a bending portion BT connecting the straight portions LN with each other. The Mach-Zehnder modulators 11a to 11d modulate the light from the input port 51e in accordance with the electrical signals MS1 to MS4 to generate the optical signals ML1 to ML4, respectively. These optical signals ML1 to ML4 are multiplexed using mergers (MG1, MG2 and MG3) to reach the output port 51f. The output port 51f supplies the output light LOUT. The pads 55a to 55d and pad 55e, which are connected to the terminating resistors and a bias voltage source 57e, are located at the first and second edges 51a and edge 51b. The pads 55a to 55d are connected to the terminating resistors 57a to 57d, respectively. Further, the pad 55e is connected to the bias voltage source 57e. These connections are implemented with bonding wires in the embodiment. The Mach-Zehnder modulators 11a to 11d use a single bias voltage source 57e. The bias voltage source 57e may include a DC voltage source that generates a bias potential to be applied to the conductive semiconductor region 13. This DC voltage source applies a potential different from the ground potential to the conductive semiconductor region 13, which is insulated from the reference potential conductor 23.

The optical integrated device 51 allows the differential transmission line 24 of the Mach-Zehnder modulator 10 to have no ground conductors outside of the first and second signal transmitting conductors 16 and 18. The differential transmission line 24 makes the ground potential stable with no occurrence of instability of the ground potential outside of the first and second signal transmitting conductors 16 and 18, thereby preventing the ground-potential instability from deteriorating high frequency characteristics of the Mach-Zehnder modulator.

Figure 4:
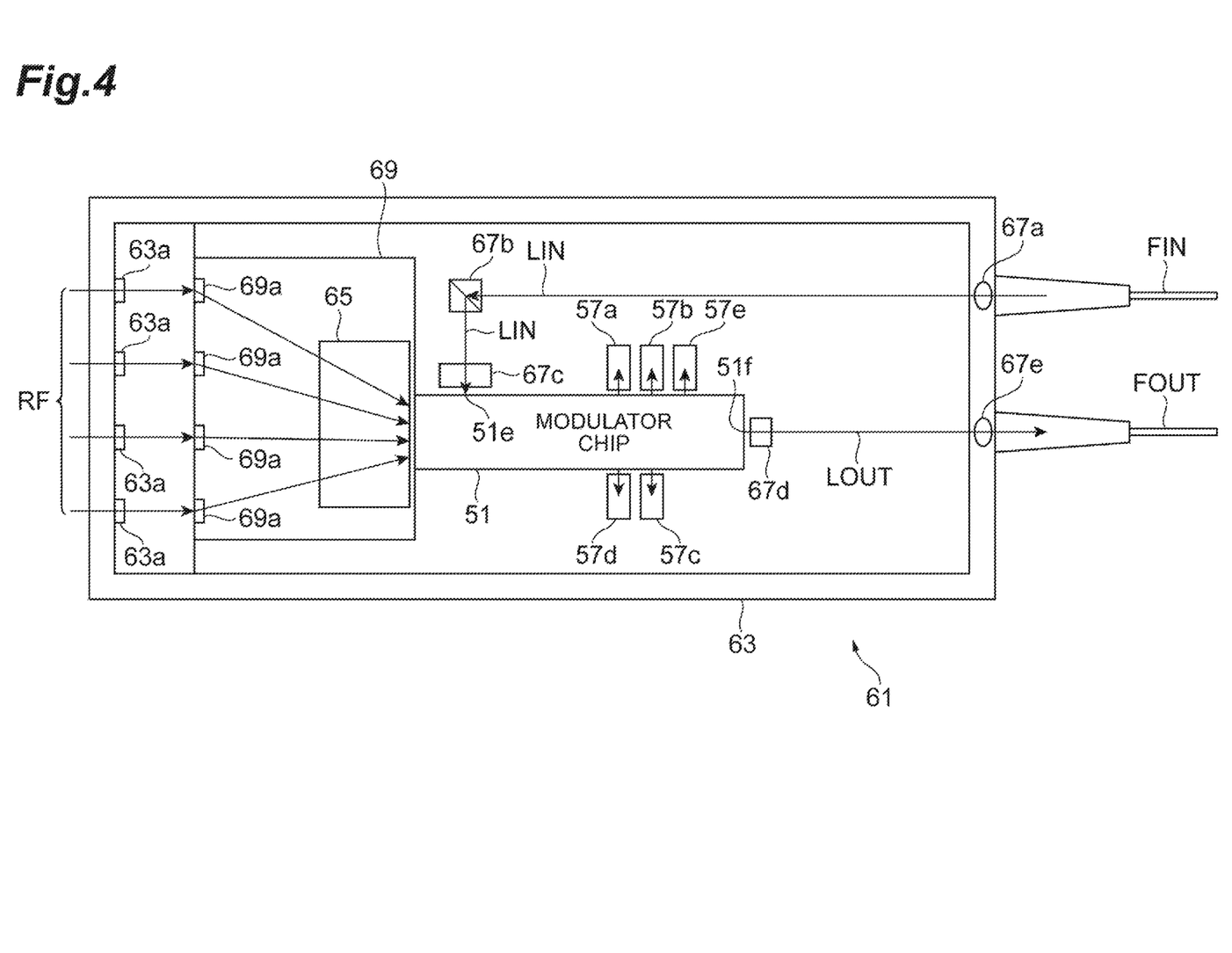
FIG. 4 is a schematic view showing a light modulating apparatus including the Mach-Zehnder modulator according to the embodiment.

FIG. 4 is a schematic view showing an optical modulating device with the Mach-Zehnder modulator according to the embodiment. The optical modulating device 61 is provided with the optical integrated device 51, which includes one or more Mach-Zehnder modulators, a housing 63 accommodating the optical integrated device 51, and a driving circuit 65. The driving circuit 65 serves as a differential signal source that drives the first and second semiconductor arms 15 and 17 via the differential transmission line 12. The housing 63 is connected to an input optical fiber FIN and an output optical fiber FOUT. The input optical fiber FIN (the input light LIN) is optically coupled to the input port 51e via a collimating lens 67a, a mirror 67b, and a collimating lens 67c. The output port 51f (the output light LOUT) is optically coupled to the output optical fiber FOUT via a collimating lens 67d and a collimating lens 67e. The housing 63 receives an RF input signal at the electrode 63a. The RF input signal RF is supplied to the driving circuit 65 via the electrode 63a of the interconnecting board 69, and the driving circuit 65 drives the optical integrated device 51.

The optical modulation device 61 is provided with the differential transmission line 24 of the Mach-Zehnder modulator 10, which includes no ground conductor outside of the first and second signal transmitting conducting bodies 16 and 18, thereby preventing the outer ground-potential instability from deteriorating high frequency characteristics of the Mach-Zehnder modulator.

Figure 5A:
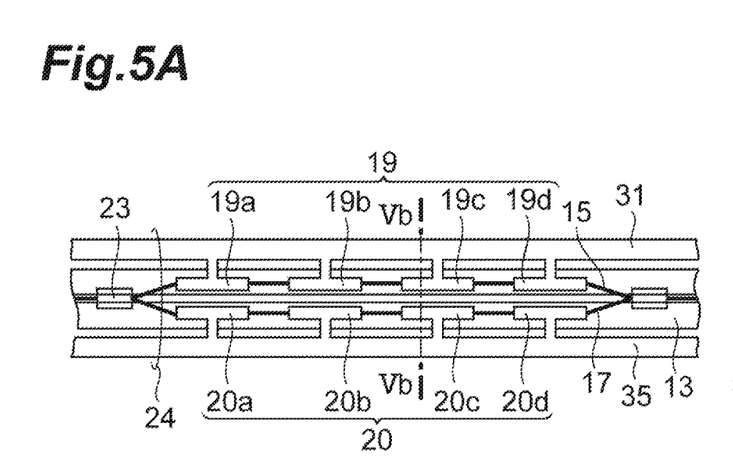
FIG. 5A is a plan view showing the arrangement of arm waveguides and interconnects of the Mach-Zehnder modulator according to the present embodiment.
Figure 5B:
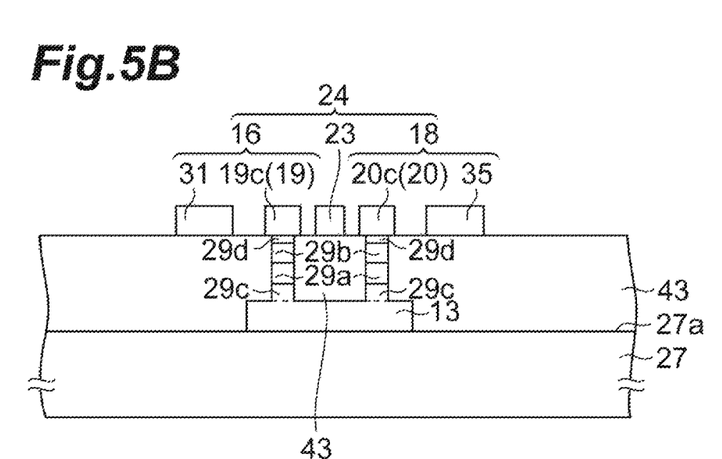
FIG. 5B is a cross sectional view, taken along Vb-Vb line shown in FIG. 5A.
Figure 5C:
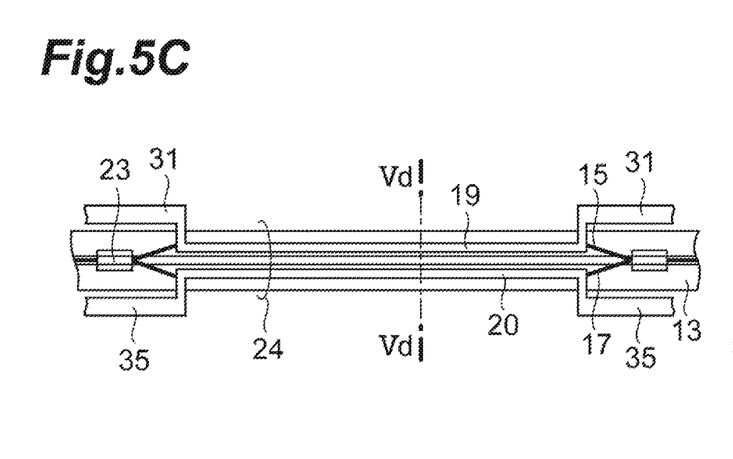
FIG. 5C is a plan view showing the arrangement of arm waveguides and interconnects of the Mach-Zehnder modulator according to the present embodiment.
Figure 5D:
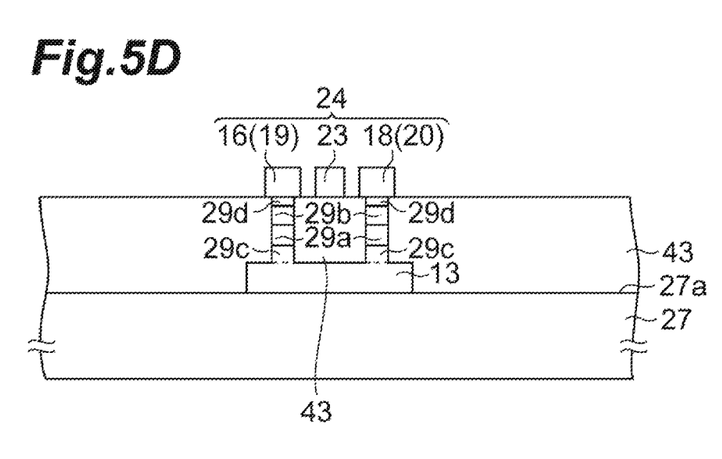
FIG. 5D is a cross sectional view, taken along Vd-Vd line shown in FIG. 5C.

FIGS. 5A, 5B, 5C, 5D and 5E are views showing the arrangement of arm waveguides and interconnects of the Mach-Zehnder modulator according to the present embodiment. FIGS. 5A and 5C are plan views each showing the arrangement of the arm waveguides and the interconnects of the Mach-Zehnder modulator according to the embodiment, and FIGS. 5B and 5D are cross-sectional views taken along lines Vb-Vb and Vd-Vd lines in FIGS. 5A and 5C. As seen from FIGS. 5A to 5D, the first and second electrodes 19 and 20 of the differential transmission line 24 is connected to the first and second semiconductor arms 15 and 17 so as to receive the differential driving signal, which is applied to the first and second semiconductor arms 15 and 17, respectively. Each of the Mach-Zehnder modulators, as shown in FIGS. 5A and 5C, is provided with the electrode 22 in contact with the conductive semiconductor region 13 at one end thereof, which is similar to that of FIG. 2A.

Figure 6A:
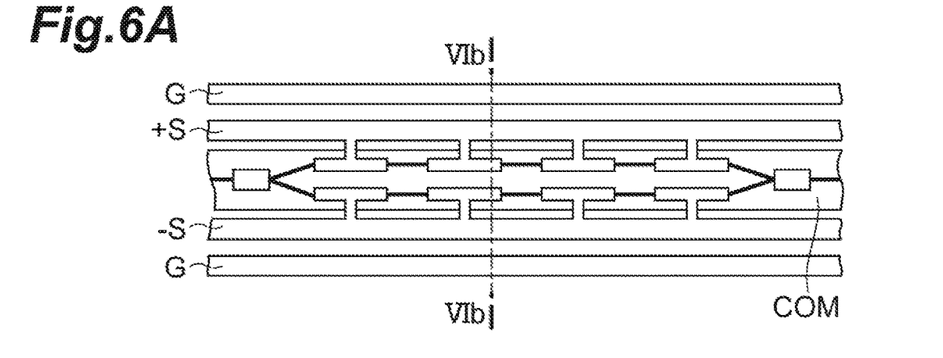
FIG. 6A is a plan view showing a modulator having a differential transmission line of a GSSG structure.
Figure 6B:
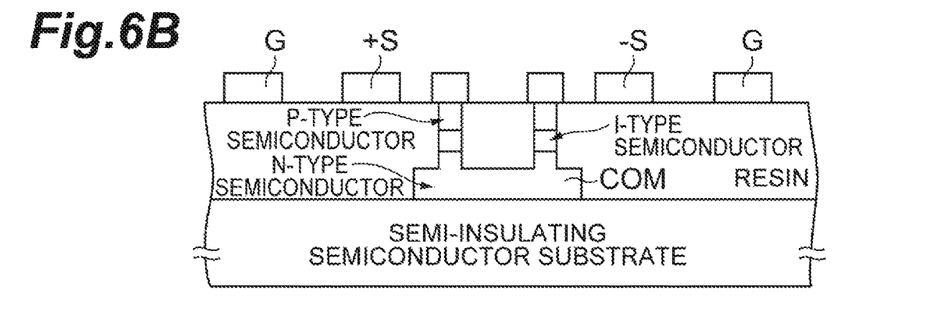
FIG. 6B is a cross sectional view taken along VIb-VIb line shown in FIG. 6A.
Figure 6C:
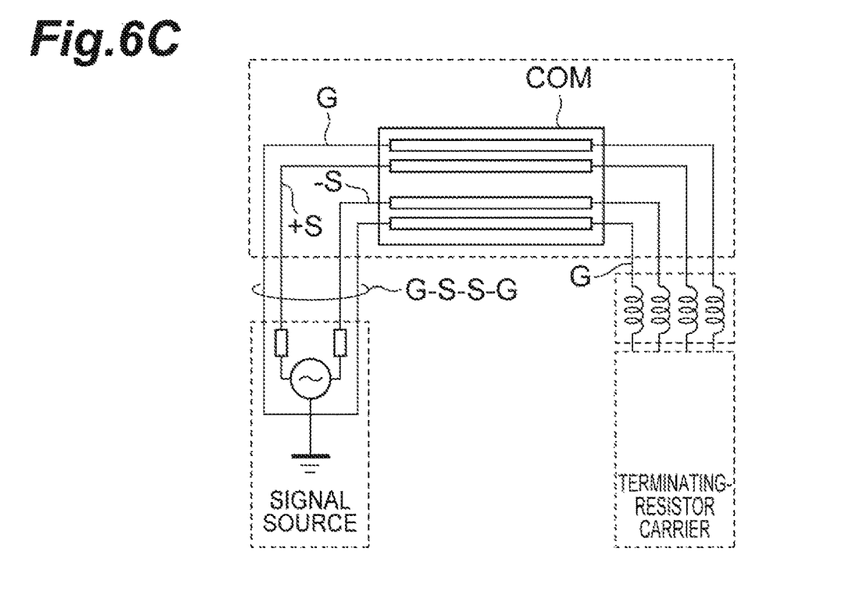
FIG. 6C is a schematic view showing a circuit diagram, including parasitic elements, of the modulator shown in FIG. 6A.

FIGS. 6A, 6B and 6C are views showing a structure of a modulator with a differential transmission line of a GSSG structure and an equivalent circuit thereof. Referring to FIG. 6A, which schematically illustrates the modulator, a pair of arm waveguides are driven by a pair of signal lines (+S and −S). This modulator includes a pair of GND conductors (G and G) extending outside the signal lines (+S and −S) along the respective signal lines (+S and −S) and a conductive semiconductor region COM, which connects these arm waveguides with each other, common to the waveguides. The conductive semiconductor region COM is connected to no metal interconnects. FIG. 6B is a cross sectional view taken along line VIb-VIb shown in FIG. 6A. This cross section shows that the arrangement of the signal and GND lines has a GSSG structure. FIG. 6C is an equivalent circuit diagram showing the modulator shown in FIG. 6B. This equivalent circuit is prepared by the inventor. The inventor also calculates EE transmission characteristics by simulation using the equivalent circuit. In an actual measurement, the one and the other ends of the GSSG differential transmission line on the modulator chip mounted are aligned with respective high-frequency probes (each of which has a probe with the arrangement of needles for the GSSG), which are connected to a vector network analyzer, and the vector network analyzer generates small-signal transmission characteristics between the two high frequency probes (the difference in voltage amplitude between a high frequency signal input to the chip through one of the high frequency probes and the voltage amplitude of a high frequency signal output from the other) to measure characteristic Sdd 21.

Figure 7A:
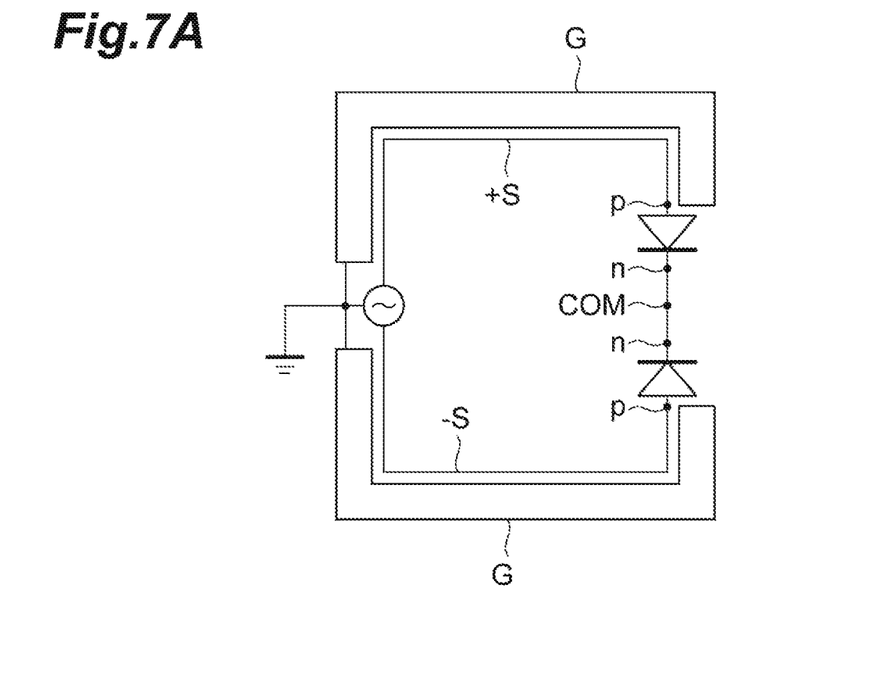
FIG. 7A is a schematic view showing an equivalent circuit of the modulator shown in FIG. 6C.
Figure 7B:
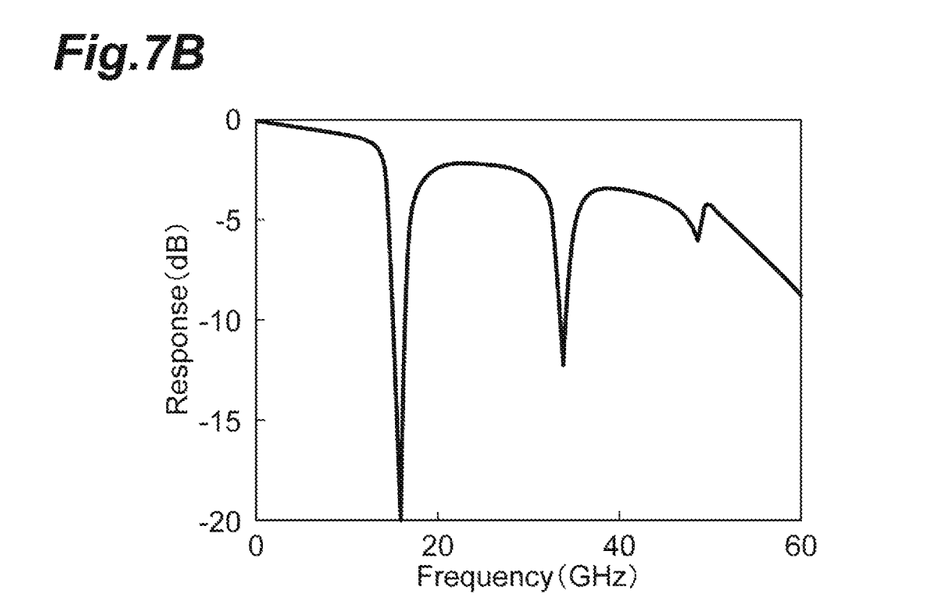
FIG. 7B is a view showing high frequency characteristics of the modulators shown in FIG. 6C.

FIG. 7A shows the electrical connection of signal sources and two pin-diodes in the semiconductor arms. This connection also provides the topological network of the signal lines (+S and −S) and the ground lines (G and G), which are connected to the two pin-diodes. The ground lines extend along the respective signal lines outside thereof. FIG. 7B shows the simulated characteristic Sdd 21 in the equivalent circuit shown in FIG. 7A, where the horizontal axis represents the frequency of the high frequency signal, and the vertical axis represents the transmission characteristics. The frequency response of the EE transmission characteristics in FIG. 7B exhibits periodic dips. This tendency of the periodic dips is also seen in the frequency response of the E/O modulated wave, and degrades transmission quality.

In order to avoid the periodic dips in the frequency response, the inventor analyzes undesired characteristics resulting from the equivalent circuit as shown in FIGS. 6B and 6C and FIGS. 7A and 7B. The inventor's analysis and findings reveal that the poor characteristics result from an unstable AC potential of the outer GND lines of about 100-micrometer width and that the structure of the Mach-Zehnder modulator according to the embodiment makes the characteristics stable. This Mach-Zehnder modulator is provided with the structure that has two signal transmission conductors and a single ground potential conductor therebetween. The location of the single ground potential conductor does not contravene the virtual ground plane from the active components of the differential signal on the signal transmitting conductors. There is no ground potential conductor outside of the two signal transmitting conductors in the Mach-Zehnder modulator, which needs no outer GND lines that cause instability of the GND potential.

Figure 8A:
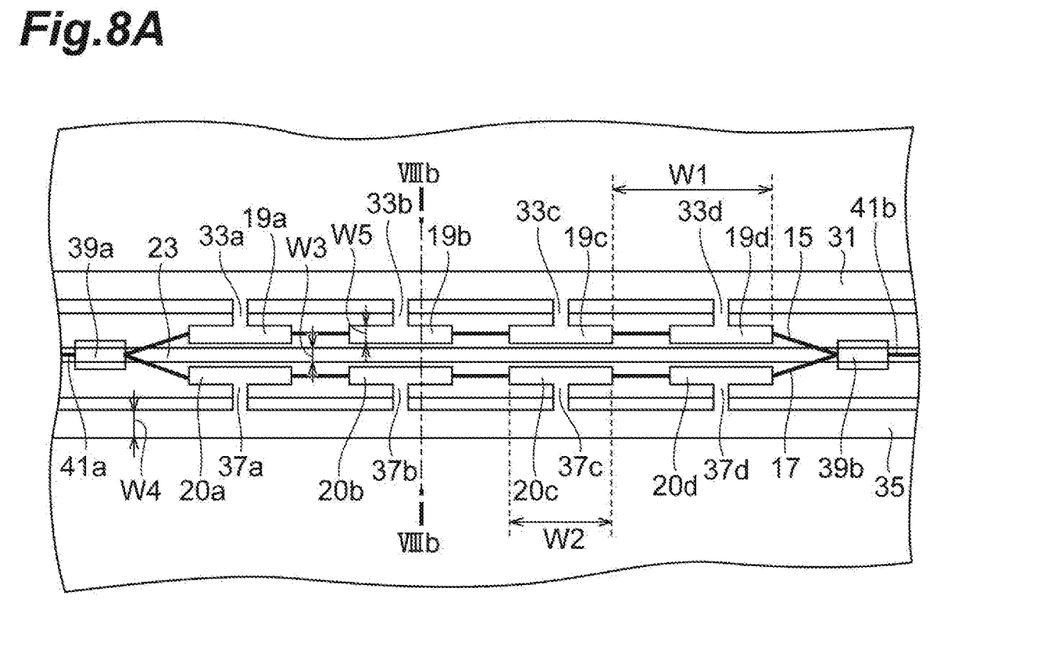
FIG. 8A is a plan view showing a Mach-Zehnder modulator according to the embodiment.
Figure 8B:
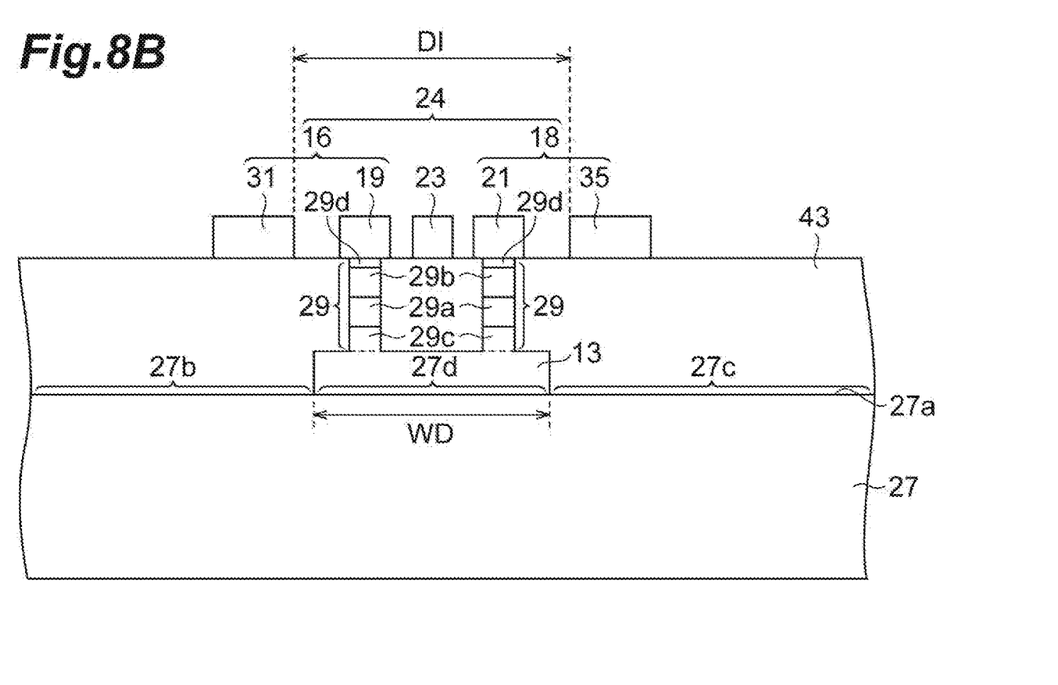
FIG. 8B is a cross sectional view taken along VIIIb-VIIIb line shown in FIG. 8A.

FIG. 8A is a plan view showing the Mach-Zehnder modulator according to the embodiment, and FIG. 8B is a cross-sectional view taken along line VIII-VIII shown in FIG. 8A. For easy understanding, the reference numerals of FIG. 1 are used in FIGS. 8A and 8B.

An exemplary semiconductor device.
Supporting base 27: semi-insulating InP substrate.
Conductive semiconductor region 13: Si-doped InP of n-type with a thickness of 1.0 micrometer.
Lower semiconductor region 29*c*: Si-doped InP of n-type with a thickness of 0.5 micrometer.
Core layer 29*a*: quantum well structure of AlGaInAs-based semiconductor with a thickness of 0.5 micrometer.
Cladding region of the upper semiconductor layer 29*b*: Zn-doped InP of p-type with a thickness of 1.0 micrometer.
Contact layer 29*d*: Zn-doped GaInAs of p-type with a thickness of 0.2 micrometer.
Embedding region 43: Benzocyclobutene (BCB) resin.
Electrodes (19*a* to 19*d*, 20*a* to 20*d*, 31, and 35): Au with a thickness of 5 micrometers.
Width W1: 250 micrometers.
Width W2: 125 micrometers.
Width W3: 10 to 50 micrometers, for example, 25 micrometers.
Width W4: 100 micrometers.
Width W5: 5 micrometers.
The first electrode sections 19*a* to 19*d* and the second electrode sections 20*a* to 20*d* are periodically arranged.
The distance Dl between the first and second conductors 31 and 35 is larger than the width WD of the strip-shaped conductive semiconductor region 13.
Driving circuit DRV: RF voltage amplitude of 1 to 4 volts.

External voltage source BIAS (57*e*): DC voltage in the range of 2 to 20 volts, where the DC bias voltage is adjusted to enable large change in optical phase in response to RF voltage applied.

Figure 9A:
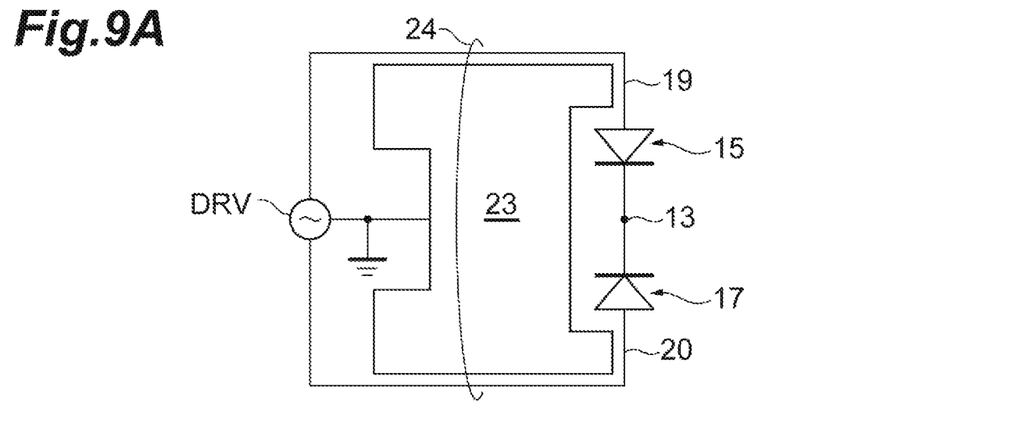
FIG. 9A is a view showing the interconnection of respective pin-diodes in the semiconductor arms of the Mach-Zehnder modulator and a signal source coupled to the optical modulator shown in FIG. 8A.
Figure 9B:
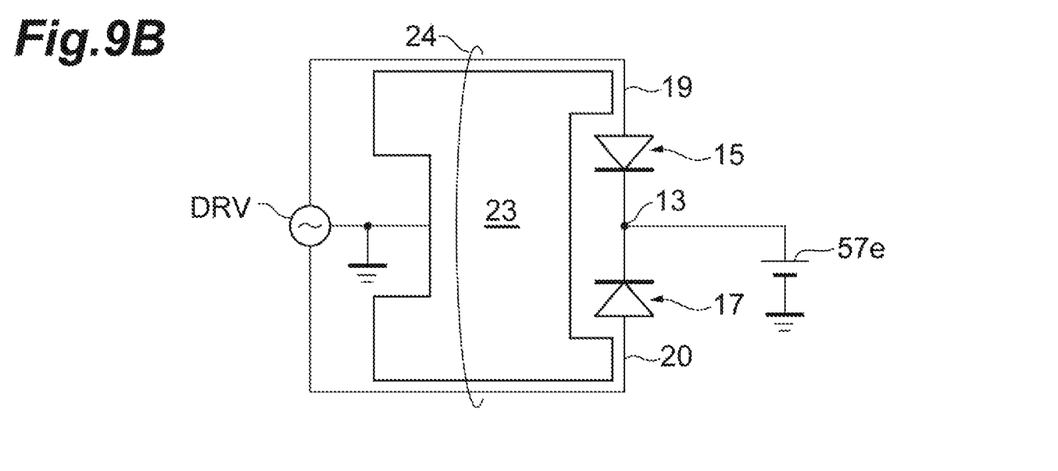
FIG. 9B is a view showing the interconnection of two pin diodes in the semiconductor arms of the Mach-Zehnder modulator and a signal source and a voltage source applied to the optical modulator shown in FIG. 8A.
Figure 9C:
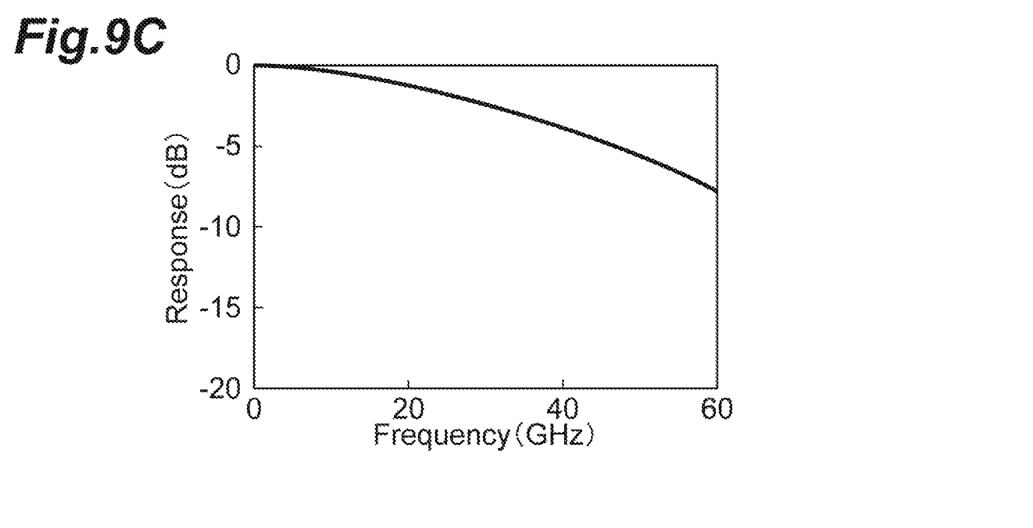
FIG. 9C is a view showing high frequency characteristics of the modulators shown in FIGS. 9A and 9B.

FIGS. 9A, 9B and 9C show the electrical arrangement and characteristics of the Mach-Zehnder modulator according to the embodiment. Specifically, FIG. 9A shows the circuit connection in each of the multiple Mach-Zehnder modulators in one optical modulating device according to the embodiment, and FIG. 9B shows the circuit connections in each of the multiple Mach-Zehnder modulators in the optical modulating device in another optical modulating device according to the embodiment, and these circuit connections each have a signal source, two pin-diodes in the semiconductor arms, as shown in FIGS. 8A and 8B, and a topological network which has signal and ground lines connected to the two pin diodes. The ground line extends inside along the signal lines. FIG. 9C shows the simulated characteristics Sdd 21 in the equivalent circuit shown in FIGS. 9A and 9B, where the horizontal axis represents the frequency of the high frequency signal, and the vertical axis represents the transmission characteristics. This simulation is calculated by the inventor. The propagation characteristics of FIG. 9C shows that the loss gradually increases with frequency of the applied signal from the signal source (the driving circuit DRV).

Figure 10:
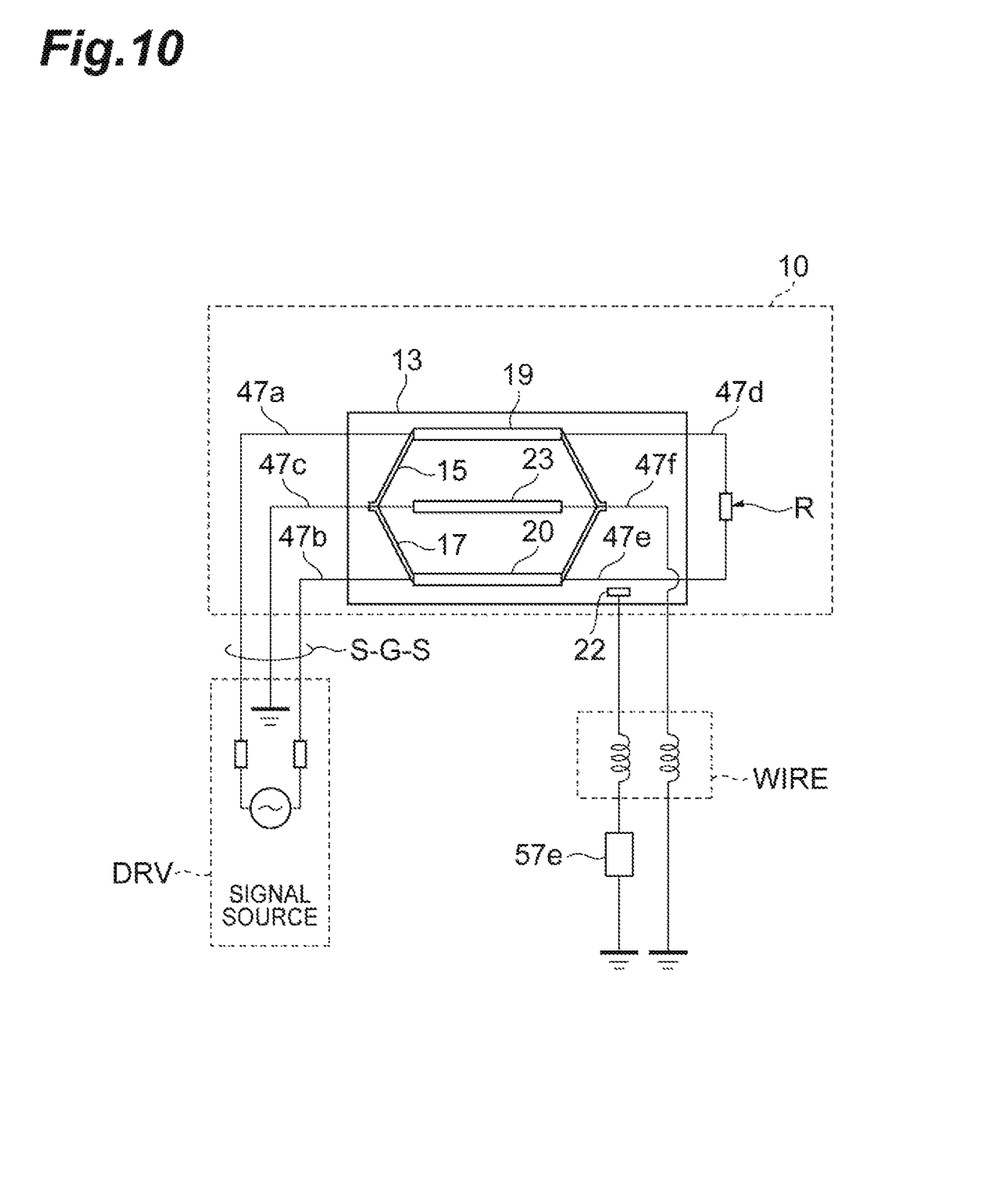
FIG. 10 is a view showing a Mach-Zehnder modulator, which integrates a thin film resistor that terminates the differential transmission line of the SGS structure, according to the embodiment.

FIG. 10 shows a modulator chip that integrates thin-film resistors for the terminating structure that can terminate the SGS structure. In the modulator shown in FIGS. 8A and 8B, a terminating resistance carrier is disposed on a carrier which mounts the modulator chip. The termination of the differential transmission line and the waveguide arms applicable to the SGS structure is not limited to the present embodiment. For example, the terminating structure shown in FIG. 10 can be applied to the Mach-Zehnder modulator according to the present embodiment. This terminating structure is effective in and convenient for the Mach-Zehnder modulator according to the present embodiment. The differential transmission line of the Mach-Zehnder modulator shown in each of FIGS. 8A and 8B and FIG. 10 is provided with the SGS structure. The transmission line of the SGS structure connects a signal source to a pair of arm waveguides at one end of the Mach-Zehnder modulator while the GND line is not connected to a common semiconductor associated with the pair of arm waveguides. The pair of arm waveguides is connected to each other through the terminating resistor R on the modulator chip around the other end of the Mach-Zehnder modulator, and the GND electrode of the transmission line is connected to the pad, which is grounded via the wiring conductor WIRE. The terminating resistor R is formed of a thin-film resistor on a supporting base for the Mach-Zehnder modulator in the semiconductor device. The thin-film resistor acting as a terminating resistor on the modulator chip can be made of, for example, NiCr and can have a value of, for example, 75 to 100 ohms.

The embodiment as described above provide a Mach-Zehnder modulator with a differential transmission line enabling a stable ground potential, and a light modulation device including the Mach-Zehnder modulator.

Having described and illustrated the principle of the invention in a preferred embodiment thereof, it is appreciated by those having skill in the art that the invention can be modified in arrangement and detail without departing from such principles. We therefore claim all modifications and variations coining within the spirit and scope of the following claims.

What is claimed is:

1. A Mach-Zehnder modulator comprising:
a first pad electrode and a second pad electrode;
a first semiconductor arm including a lower semiconductor region, an upper semiconductor layer, and a core layer disposed between the lower semiconductor region and the upper semiconductor layer;
a second semiconductor arm including a lower semiconductor region, an upper semiconductor layer, and a core layer disposed between the lower semiconductor region and the upper semiconductor layer;
a conductive semiconductor region connecting the lower semiconductor region of the first semiconductor arm and the lower semiconductor region of the second semiconductor arm with each other; and
a differential transmission line including a first signal transmitting conductor, a second signal transmitting conductor, and a reference potential conductor, the first signal transmitting conductor and the second signal transmitting conductor being coupled to the first semiconductor arm and the second semiconductor arm, respectively, the reference potential conductor extending on the conductive semiconductor region between the first signal transmitting conductor and the second signal transmitting conductor to connect the first pad electrode and the second pad electrode, and the reference potential conductor being isolated from the conductive semiconductor region.

2. The Mach-Zehnder modulator according to claim 1, further comprising an electrode connected to the conductive semiconductor region.

3. The Mach-Zehnder modulator according to claim 1, wherein
the first signal transmitting conductor is disposed on the first semiconductor arm and is connected to the first semiconductor arm, and
the second signal transmitting conductor is disposed on the second semiconductor arm and is connected to the second semiconductor arm.

4. The Mach-Zehnder modulator according to claim 1, wherein
the first signal transmitting conductor includes a first conductor and multiple first electrodes, and the first conductor is connected to the first semiconductor arm through the multiple first electrodes,
the second signal transmitting conductor includes a second conductor and multiple second electrodes, and the second conductor is connected to the second semiconductor arm through the multiple second electrodes,
the multiple first electrodes are arranged to be spaced apart from one another on the first semiconductor arm, and
the multiple second electrodes are arranged to be spaced apart from one another on the second semiconductor arm.

5. The Mach-Zehnder modulator according to claim 4, wherein
the first semiconductor arm includes first portions each of which has a contact layer, and second portions each of which has no contact layer, and
the second semiconductor arm includes first portions each of which has a contact layer, and second portions each of which has no contact layer.

6. A light modulating apparatus comprising:
a Mach-Zehnder modulator; and
a differential signal source,
the Mach-Zehnder modulator including,
a first pad electrode and a second pad electrode,
a first semiconductor arm including a lower semiconductor region, an upper semiconductor layer, and a core layer disposed between the lower semiconductor region and the upper semiconductor layer,
a second semiconductor arm including a lower semiconductor region, an upper semiconductor layer, and a core layer disposed between the lower semiconductor region and the upper semiconductor layer,
a conductive semiconductor region connecting the lower semiconductor region of the first semiconductor arm and the lower semiconductor region of the second semiconductor arm with each other, and
a differential transmission line including a first signal transmitting conductor, a second signal transmitting conductor, and a reference potential conductor, the first signal transmitting conductor and the second signal transmitting conductor being coupled to the first semiconductor arm and the second semiconductor arm, respectively, the reference potential conductor extending on the conductive semiconductor region between the first signal transmitting conductor and the second signal transmitting conductor to connect the first pad electrode and the second pad electrode, and the reference potential conductor being isolated from the conductive semiconductor region, and
the differential signal source driving the first semiconductor arm and the second semiconductor arm through the differential transmission line.

7. The light modulating apparatus according to claim 6, further comprising a direct current voltage source, the direct current voltage source supplying the conductive semiconductor region with a bias voltage.

* * * * *